(12) United States Patent
Kim et al.

(10) Patent No.: US 11,086,952 B2
(45) Date of Patent: Aug. 10, 2021

(54) SERVER DEVICE AND METHOD FOR COLLECTING LOCATION INFORMATION OF OTHER DEVICES

(71) Applicant: Samsung Electronics Co., Ltd, Suwon-si (KR)

(72) Inventors: Jinwoo Kim, Suwon-si (KR); Chaeman Lim, Suwon-si (KR); Hyejoong Kang, Suwon-si (KR); Bumsoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 16/510,754

(22) Filed: Jul. 12, 2019

(65) Prior Publication Data

US 2020/0019580 A1    Jan. 16, 2020

(30) Foreign Application Priority Data

Jul. 13, 2018    (KR) ........................ 10-2018-0081927

(51) Int. Cl.
*G06F 16/9537* (2019.01)
*H04W 4/029* (2018.01)
(Continued)

(52) U.S. Cl.
CPC ...... *G06F 16/9537* (2019.01); *G06F 16/2379* (2019.01); *G06F 16/24578* (2019.01);
(Continued)

(58) Field of Classification Search
CPC ..... G01S 5/0027; H04W 4/021; H04W 4/029; H04W 12/0013; H04W 64/00;
(Continued)

(56) References Cited

U.S. PATENT DOCUMENTS 7,305,245 B2    12/2007    Alizadeh-Shabdiz et al.
7,433,694 B2    10/2008    Morgan et al.
(Continued)

FOREIGN PATENT DOCUMENTS

EP         2333575 A2    6/2011

OTHER PUBLICATIONS

ISA/KR, International Search Report and Written Opinion of the International Searching Authority, International Application No. PCT/KR2019/008502, Oct. 16, 2019, 10 pages.
(Continued)

*Primary Examiner* — Etienne P Leroux

(57) ABSTRACT

A server device, which includes a communication interface; a memory; and a processor operatively connected to the communication interface and the memory. The memory is configured to store a first database including identifiers of access points and location information. The processor is configured to: receive, from an external electronic device through the communication interface, an identifier of at least one access point including a first access point collected by the external device and an identifier of a base station, identify location information matching the identifier of the at least one access point and/or the identifier of the base station in the first database, and update location information matching an identifier of the first access point in the first database based on the identified location information.

17 Claims, 14 Drawing Sheets

(51) Int. Cl.
 *G06F 16/29* (2019.01)
 *G06F 16/951* (2019.01)
 *G06F 16/2457* (2019.01)
 *G06F 16/23* (2019.01)
 *H04W 88/08* (2009.01)

(52) U.S. Cl.
 CPC ............ *G06F 16/29* (2019.01); *G06F 16/951* (2019.01); *H04W 4/029* (2018.02); *H04W 88/08* (2013.01)

(58) Field of Classification Search
 CPC .......................... A61B 5/1115; H04N 5/232; G06Q 10/06311; G06Q 20/3224; H04L 63/18; H04L 69/28; G06F 11/3065; G06F 16/9537; G16H 40/63
 See application file for complete search history.

(56) References Cited

U.S. PATENT DOCUMENTS

| | | | |
|---|---|---|---|
| 7,471,954 | B2 | 12/2008 | Brachet et al. |
| 8,577,731 | B1* | 11/2013 | Cope .................. G06Q 20/3224 705/17 |
| 9,226,257 | B2 | 12/2015 | Edge et al. |
| 9,516,514 | B2 | 12/2016 | Cho et al. |
| 2008/0192118 | A1* | 8/2008 | Rimbold ................ H04N 5/232 348/159 |
| 2010/0026514 | A1* | 2/2010 | Becker ................. G01S 5/0027 340/8.1 |
| 2011/0122858 | A1 | 5/2011 | Yashiro et al. |
| 2012/0157123 | A1 | 6/2012 | Li et al. |
| 2013/0155876 | A1* | 6/2013 | Potra ...................... H04L 69/28 370/248 |
| 2013/0182697 | A1 | 7/2013 | Tuominen et al. |
| 2013/0303186 | A1* | 11/2013 | Gordon ................. H04W 64/00 455/456.1 |
| 2014/0343896 | A1* | 11/2014 | Le Grand ........... G06F 11/3065 702/187 |
| 2015/0012332 | A1* | 1/2015 | Papachristos .... G06Q 10/06311 705/7.29 |
| 2016/0192141 | A1 | 6/2016 | Park et al. |
| 2016/0234645 | A1 | 8/2016 | Belghoul et al. |
| 2017/0064515 | A1* | 3/2017 | Heikkila ............... H04W 4/021 |
| 2017/0126409 | A1* | 5/2017 | Freudiger ......... H04W 12/0013 |
| 2017/0147772 | A1* | 5/2017 | Meehan ................ G16H 40/63 |
| 2018/0063111 | A1* | 3/2018 | Vasudevan .............. H04L 63/18 |
| 2018/0374570 | A1* | 12/2018 | Nishikado ............ A61B 5/1115 |
| 2019/0007789 | A1* | 1/2019 | Margoles ............. H04W 4/029 |

OTHER PUBLICATIONS

Supplementary European Search Report dated Jun. 8, 2021 in connection with European Patent Application No. 19 83 3071, 12 pages.

* cited by examiner

SERVER DEVICE AND METHOD FOR COLLECTING LOCATION INFORMATION OF OTHER DEVICES

CROSS-REFERENCE TO RELATED APPLICATION

This application is based on and claims priority under 35 U.S.C. 119 to Korean Patent Application No. 10-2018-0081927 filed on Jul. 13, 2018 in the Korean Intellectual Property Office, the disclosure of which is herein incorporated by reference in its entirety.

BACKGROUND

1. Field

The disclosure relates to a server device, and more particularly, to a server device capable of collecting and storing location information of other devices including access points and/or base stations, and a method by the server device for collecting the location information of the other devices.

2. Description of the Related Art

A portable electronic device (hereinafter, electronic device), such as a smart phone or a tablet PC, is provided with one or more wireless communication functions (e.g., cellular communication and Wi-Fi), and thus it can transmit and receive data with another device. Further, based on such wireless communication functions, the electronic device can provide a user with various user experiences. The electronic device can execute various kinds of applications, and among them, applications that provide location based services (LBS), such as a map, navigation, and social network service (SNS), can acquire location information of the electronic device, and based on this, the applications can provide services to the user.

In order to utilize the above-described applications, the electronic device may request its own location information from an external server device. The server device may construct a database including location information of various devices, and if the electronic device requests its own location information from the server device, the server device may search for the location information corresponding to the electronic device in the database based on the information received from the electronic device, and it may provide the searched location information to the electronic device.

SUMMARY

A server device in the related art is unable to acquire the location of an electronic device in the case where accurate location information is not acquired because the electronic device is located indoors or the like.

In order to provide accurate location information to an electronic device, various embodiments of the disclosure provide a server device capable of constructing and updating a database including location information of various access points and/or base stations, and a method by the server device for collecting location information of other devices.

According to various embodiments, a server device may include a communication interface; a memory; and a processor operatively connected to the communication interface and the memory, wherein the memory is configured to store a first database including identifiers of access points and location information, and the processor is configured to: receive, from an external electronic device through the communication interface, an identifier of at least one access point including a first access point collected by the external device and an identifier of a base station, identify location information matching the identifier of the at least one access point and/or the identifier of the base station in the first database, and update location information matching an identifier of the first access point in the first database based on the identified location information.

According to various embodiments, an electronic device may include a global positioning system (GPS) sensor; a first wireless communication circuit configured to support a near field communication with at least one access point; a second wireless communication circuit configured to support a cellular communication with at least one base station; and a processor operatively connected to the GPS sensor, the first wireless communication circuit, the second wireless communication circuit, and a memory, wherein the processor is configured to: receive, from an external server, a request for an identifier of a first access point device and GPS location information using the first wireless communication circuit or the second wireless communication circuit, scan at least one adjacent access point device using the first wireless communication circuit, identify the GPS location information using the GPS sensor if the first access point device is scanned as the result of the scan, and transmit the GPS location information to the server device using the first wireless communication circuit or the second wireless communication circuit.

According to various embodiments, a method by a server device for collecting location information of other devices, the server device storing a first database including identifiers of access points and location information, the method may include receiving, from an external electronic device, an identifier of at least one access point including a first access point collected by the external electronic device and an identifier of a base station; identifying location information matching the identifier of the at least one access point and/or the identifier of the base station in the first database; and updating location information matching an identifier of the first access point in the first database based on the identified location information.

According to the various embodiments of the disclosure, it is possible to provide a server device capable of constructing and updating a database including location information of various access points and/or base stations in order to provide accurate location information to an electronic device, and a method by the server device for collecting location information of other devices.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
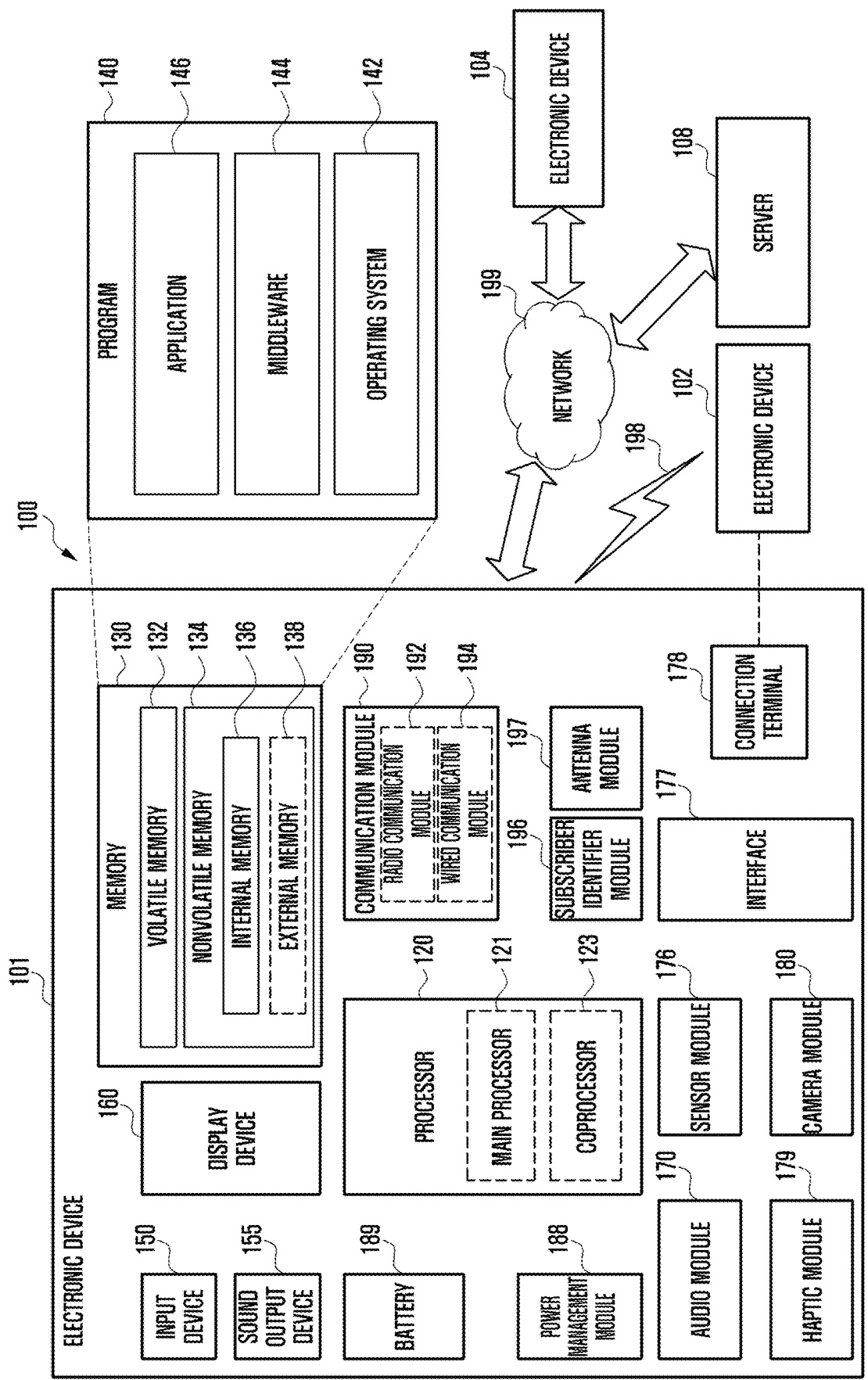
FIG. 1 illustrates a block diagram of an electronic device in a network environment according to various embodiments.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
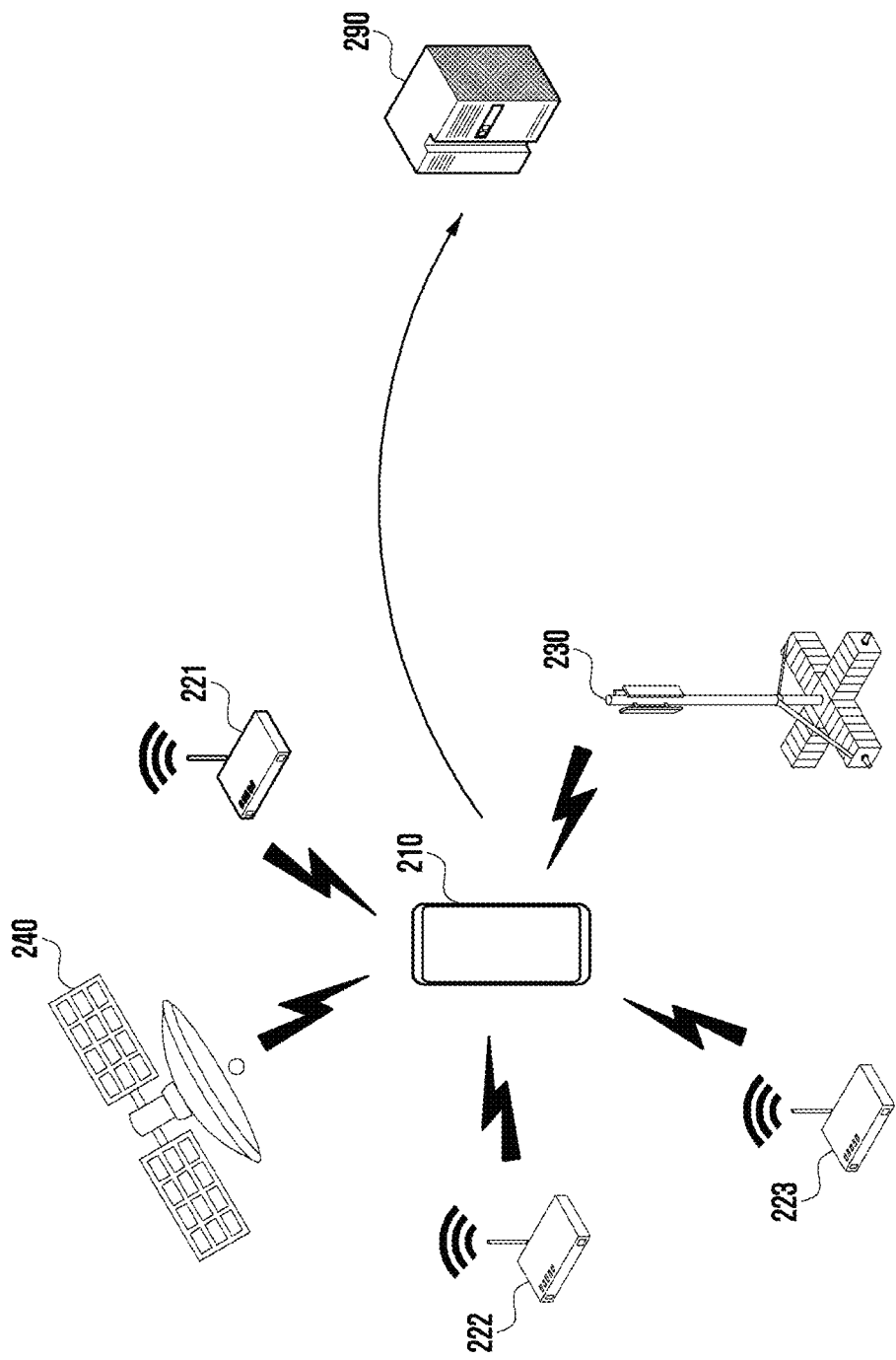
FIG. 2 illustrates a diagram of various devices for location determination of an electronic device according to various embodiments.

FIG. 2 illustrates a diagram of various devices for location determination of an electronic device according to various embodiments.

According to various embodiments, an electronic device 210 (e.g., electronic device 101 of FIG. 1) may collect and transmit, to a server device 290 (e.g., server 108 of FIG. 1) location information of at least one base station 230 adjacent to the electronic device 210 and at least one access point (SAP) 221, 222, and 223, and the server device 290 may construct and update a database including the location information of the respective access points 221, 222, and 223, and/or the base station 230 based on data received from the electronic device 210.

With reference to FIG. 2, the electronic device 210 according to various embodiments may be implemented by a portable electronic device, such as a smart phone or a tablet PC, but it is not limited thereto, and various kinds of devices provided with wireless communication functions (e.g., cellular communication and/or near field communication) may correspond to the electronic device 210 in the description. For example, the electronic device 210 may be a tag device having only a wireless communication function for location tracking.

According to various embodiments, the electronic device 210 can communicate with the adjacent access points 221, 222, and 223 using the near field communication. The near field communication may include Wi-Fi. The communicable distance with the access points 221, 222, and 223 may be about 10 to 200 m, and it may differ depending on the specifications of the access points 221, 222, and 223, and the surrounding communication environment.

According to various embodiments, the respective access points 221, 222, and 223 may have inherent identifiers, and the inherent identifier may include a basic service set identifier (BSSID). The access points 221, 222, and 223 can periodically broadcast a beacon signal including its own identifier, and the electronic device 210 can receive the beacon signal, and it can acquire the identifiers of the respective adjacent access points 221, 222, and 223. If a plurality of access points exist around the electronic device 210, the electronic device 210 can acquire all the identifiers of the plurality of access points.

In the case of intending to access a network (e.g., public data network) using one of the access points 221, 222, and 223, the electronic device 210 may select one of the searched adjacent access points 221, 222, and 223 using a user's input or setting configuration information, and it may transmit and receive data with various devices on the network by accessing the network using the selected access point.

According to various embodiments, the electronic device 210 may communicate with the base station 230 to perform a cellular communication. The cellular communication corresponds to various kinds of mobile communication systems in which a user subscribes through mobile communication service providers, and it enables various mobile communication protocols, such as LTE, LTE-A, CDMA, WCDMA, UMTS, WiBro, and GSM, to be used, but it is not limited to the above-described examples. The electronic device 210 may transmit and receive data with various devices on the network by accessing the network through any one of base stations 230.

Each base station 230 includes an identifier, and the identifier of the base station 230 may include a cell identifier (CID). During an access to the base station 230, the electronic device 210 may acquire the identifier of the base station 230 being accessed. According to various embodiments, the electronic device 210 may acquire location information using a global positioning system (GPS) or a global navigation satellite system (GNSS). For this, the electronic device 210 may include a GPS sensor (or GNSS sensor) (not illustrated) that can receive a signal of a GPS satellite 240, and it may determine its own location using a known location measurement technique (e.g., code tracking or phase tracking) based on the signal received from at least one GPS satellite 240. The GPS sensor may be included in at least one of a wireless communication module (e.g., wireless communication module 192 of FIG. 1) or a sensor module (e.g., sensor module 176 of FIG. 1).

According to various embodiments, the server device 290 may communicate with a plurality of electronic devices 210 through a network, and it may acquire location information from the respective electronic devices 210 to store the acquired location information in a database. For example, the electronic device 210 may transmits the identifier of the at least one access point 221, 222, and 223, the identifier of the base station 230, and/or GPS location information to the server device 290, and the server device 290 may map the identifier (e.g., CID) of the base station 230 to the identifier (e.g., BSSID) of the access points 221, 222, and 223 and the location information (e.g., latitude and longitude) to store the mapped information in the database, and it may update the information of the database when the corresponding information is received from several electronic devices 210.

Figure 3:
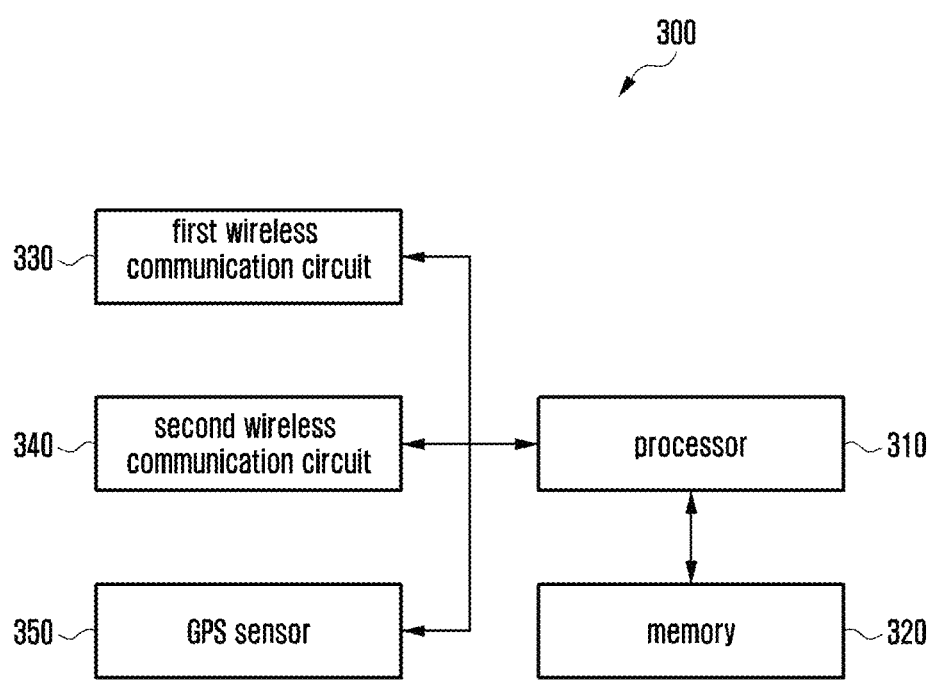
FIG. 3 illustrates a block diagram of an electronic device according to various embodiments.

FIG. 3 illustrates a block diagram of an electronic device according to various embodiments.

With reference to FIG. 3, an electronic device 300 according to various embodiments may include a processor 310, a memory 320, a first wireless communication circuit 330, a second wireless communication circuit 340, and a GPS sensor 350. Even if at least parts of the illustrated configurations are omitted or substituted, there will be no difficulty in implementing various embodiments of the disclosure. The electronic device 300 may include at least parts of the configurations and/or functions of the electronic device 101 of FIG. 1 and/or the electronic device 210 of FIG. 2.

According to various embodiments, the first wireless communication circuit 330 may support the near field communication with at least one access point (e.g., access points 221, 222, and 223 of FIG. 2). The near field communication supported by the first wireless communication circuit 330 may be Wi-Fi communication, but it is not limited thereto. The first wireless communication circuit 330 may include an antenna and at least one control circuit for data transmission/reception with the access points through the near field communication.

The access point may be the access point 221, 222, or 223 of FIG. 2. The access point may be connected to the network through an Ethernet cable, and it may provide data transmitted from the first wireless communication circuit 330 to another device (e.g., server device 290 of FIG. 2) through the network. The access point may have an inherent identifier, and the inherent identifier may include a basic service set identifier (BSSID), but it may include another identifier, such as a MAC address of the access point. The access point may periodically broadcast a beacon signal including its own identifier, and the electronic device 300 may receive the beacon signal using the first wireless communication circuit 330, and it may acquire identifiers of respective adjacent access points.

According to various embodiments, the second wireless communication circuit 340 may support the cellular communication with at least one base station (e.g., base station 230 of FIG. 2). The cellular communication supported by the second wireless communication circuit 340 has no limitations, and it may include at least one of various mobile communication protocols, for example, LTE, LTE-A, CDMA, WCDMA, UMTS, WiBro, and GSM. The second wireless communication circuit 340 may include at least one processor (e.g., communication processor).

According to various embodiments, the electronic device 300 may transmit and receive data with various devices on the network by accessing the network through any one of base stations. Each of the base stations may include an identifier, and the identifier of the base station may include a cell identifier (CID). During the access to the base station, the electronic device 300 may acquire the identifier of the accessed base station.

According to various embodiments, the global positioning system (GPS) sensor 350 may receive a signal of a GPS satellite (e.g., GPS satellite 240 of FIG. 2), and it may acquire GPS location information from the received signal using the known location measurement technique.

According to various embodiments, the processor 310 may be configured to perform control of respective constituent elements of the electronic device 300 and/or communication operation or data processing, and it may include at least a part of the configuration of the processor 120 of FIG. 1. The processor 310 may be connected to internal constituent elements of the electronic device 300, such as the first wireless communication circuit 330, the second wireless communication circuit 340, and the memory 320 operatively, electrically, and/or functionally.

According to various embodiments, the memory 320 is to temporarily or permanently store unlimited digital data, and it may include at least a part of the configuration of the memory 130 of FIG. 1. The memory 320 may include a volatile memory and a nonvolatile memory. The nonvolatile memory may include at least one of one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash), hard drive, or solid state drive (SSD), and the volatile memory may include at least one of dynamic RAM (DRAM), static RAM (SRAM), or synchronous dynamic RAM (SDRAM).

According to various embodiments, the memory 320 may store various instructions that can be performed by the processor 310. Such instructions may include control commands, such as arithmetic and logical operations, data movement, and input/output, that can be recognized by the processor 310. Further, the memory 320 may store at least a part of the program 140 of FIG. 1.

According to various embodiments, the processor 310 may identify a location information request event. Here, the location information request event may be generated by an application, and the application may be an application that provides location bases services (LBS), such as a map, navigation, and social network service (SNS). Further, the processor 310 may perform an operation for periodically identifying the location information of the electronic device 300 without any separate event.

According to various embodiments, if the location information request event occurs (or periodically), the processor 310 may identify location information of the electronic device 300, at least one adjacent access point, and/or the base station using at least one of the GPS signal of the GPS sensor 350, the near field communication of the first wireless communication circuit 330, and/or the cellular communication of the second wireless communication circuit 340. For example, if the GPS sensor 350 is in an enable state, and the current location of the electronic device 300 is a location (e.g., outdoors) in which the GPS satellite signal can be received, the processor 310 can identify the GPS location information using the GPS sensor 350. In this case, the processor 310 may provide the application by identifying the location information of the electronic device 300 using the GPS location information.

According to various embodiments, the processor 310 may identify the identifier (e.g., BSSID) of at least one access point by scanning the adjacent access point using the first wireless communication circuit 330. Further, the processor 310 may further acquire the identifier (e.g., CID) of the base station using the second wireless communication circuit 340.

According to various embodiments, the processor 310 may transmit at least parts of the acquired GPS location information, the identifier of at least one access point, and/or the identifier of the base station to the server device (e.g., server device 290 of FIG. 2) through the first wireless communication circuit 330 or the second wireless communication circuit 340. For example, if all the GPS location information, the identifier of at least one access point, and the identifier of the base station are acquired, the processor 310 may transmit them to the server device, and there is no access point located in a coverage of the near field communication (e.g., about 10 to 200 m) as the result of scanning the surrounding access points, the processor 310 may transmit the GPS location information and the identifier of the base station to the server device. Further, if the location of the electronic device 300 is the location in which the GPS satellite signal is unable to be received (e.g., inside a building), the processor 310 may transmit the acquired identifier of the at least one access point and the identifier of the base station to the server device.

According to various embodiments, the server device may match the identifier of the access point to the location information based on the GPS location information, the identifier of the access point, and the identifier of the base station acquired from several electronic devices 300, and it may construct and update the database in which the identifier of the base station matches the location information.

According to various embodiments, the electronic device 300 may receive a request for the identifier of a specific access point and the GPS location information from the server device using the first wireless communication circuit 330 and the second wireless communication circuit 340.

According to various embodiments, the server device may store location information of a plurality of priorities matching the access points on the database, and the location information of the first priority may correspond to matching of the identifier of the corresponding access point to the GPS location information if the GPS location information and the identifier of the access point are received from a specific electronic device 300. The server device may identify the identifier of at least one access point that does not match the location information of the first priority in the database, and it may request the identifier of the corresponding access point and the GPS location information from at least one electronic device 300. In this case, the server device may transmit the request to the at least one electronic device 300 that has most recently transmitted the identifier of the at least one access point that does not match the location information of the first priority and the location information.

According to various embodiments, the server device may select at least one access point that has not been collected for the longest time by aligning the access points in the order of collection of the location information in the database, and it may request the identifier of the at least one selected access point and the GPS location information from the at least one electronic device 300. Further, the server device may select at least one access point having the smallest number of times of collection by aligning the access points in the order of their number of times of collection of the location information in the database, and it may request the identifier of the at least one selected access point and the GPS location information from the at least one electronic device 300.

According to various embodiments, if the request for the identifier of a specific access point (e.g., first access point) and the GPS location information is received from the server device, the processor 310 may scan the at least one adjacent access point using the first wireless communication circuit 330. If the first access point requested by the server device is scanned as the result of the scanning, the processor 310 may identify the GPS location information using the GPS sensor. Here, if the location of the electronic device 300 is the location in which the GPS satellite signal is unable to be received (e.g., inside a building), the processor 310 may periodically perform scanning of the access points and the GPS reception, and if the identification of the first access point and the GPS reception are performed together, the processor 310 may transmit the acquired identifier of the first access point and the GPS location information to the server device. If the first access point is not identified as the result of the scanning, the processor 310 may not transmit the GPS location information to the server device.

According to various embodiments, the processor 310 may receive the location information related to the identifier of the at least one access point and/or the identifier of the base station pre-transmitted from the server device through the first wireless communication circuit 330 or the second wireless communication circuit 340. The processor 310 may determine the location of the electronic device 300 using a positioning algorithm based on the received location information. For example, the processor 310 may determine an average value of the acquired location information as the location of the electronic device 300. As another embodiment, the location information related to the identifier of the access point and/or the identifier of the base station received from the server device includes a coverage covering a predetermined area, and the processor 310 may determine an area in which coverages of the acquired location information overlap each other as the location of the electronic device 300.

According to various embodiments, the server device may identify the location information related to the identifier of the at least one access point and/or the identifier of the base station acquired from the electronic device 300 in the database, and it may determine the location of the electronic device 300 using the positioning algorithm. In this case, the electronic device 300 may receive the determined location from the server device.

According to various embodiments, the processor 310 may provide the determined location of the electronic device 300 to the applications (e.g., map, navigation, and SNS) having requested the location information, and the applications may provide various services to the user based on the location information.

The electronic device 300 according to various embodiments may include a global positioning system (GPS) sensor 350; a first wireless communication circuit 330 configured to support a near field communication with at least one access point 221, 222, and 223; a second wireless communication circuit 340 configured to support a cellular communication with at least one base station; and a processor 310 operatively connected to the GPS sensor 350, the first wireless communication circuit 330, the second wireless communication circuit 340, and a memory 320, wherein the processor 310 is configured to receive, from an external server, a request for an identifier of a first access point device and GPS location information using the first wireless communication circuit 330 or the second wireless communication circuit 340, scan at least one adjacent access point 221, 222, and 223 using the first wireless communication circuit 330, identify the GPS location information using the GPS sensor 350 if the first access point device is scanned as the result of the scan, and transmit the GPS location information to the server device using the first wireless communication circuit 330 or the second wireless communication circuit 340.

According to various embodiments, the processor 310 may be configured to perform a periodic scan if the request for the identifier of the first access point device and the GPS location information is received.

Figure 4:
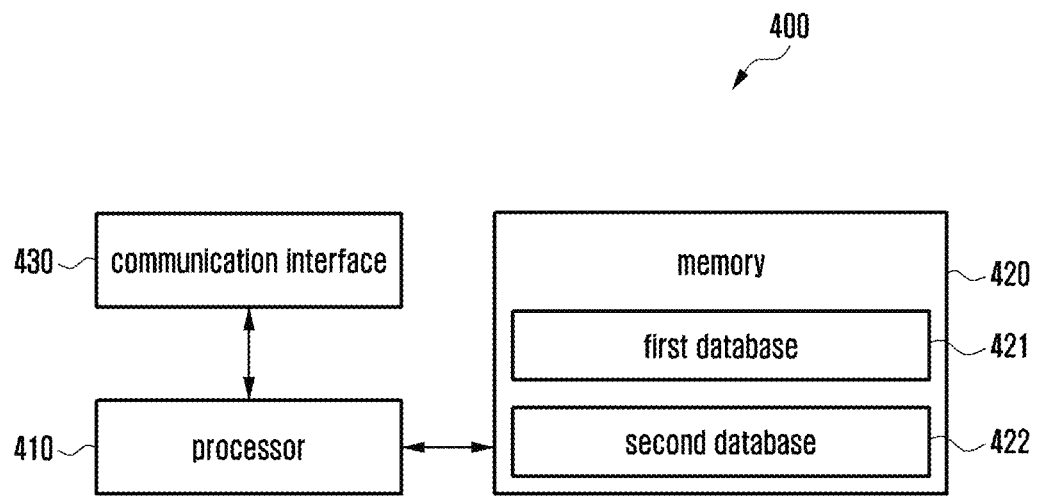
FIG. 4 illustrates a block diagram of a server device according to various embodiments.

FIG. 4 illustrates a block diagram of a server device according to various embodiments.

With reference to FIG. 4, a server device 400 may include a processor 410, a memory 420, and a communication interface 430. Even if at least parts of the illustrated configurations are omitted or substituted, there will be no difficulty in implementing various embodiments of the disclosure. The server device 400 may include at least parts of the configurations and/or functions of the server device 290 of FIG. 2.

According to various embodiments, the communication interface 430 may support communication with external electronic devices (e.g., electronic device 210 of FIG. 2). The communication interface 430 may receive data (e.g., identifier of an access point, identifier of a base station, and GPS location information) from the electronic device through a network, and it may transmit data to the electronic device (e.g., determined location of the electronic device).

According to various embodiments, the memory 420 may include a first database 421 and a second database 422. The first database 421 may match and store the identifier of the access point and the location information based on the data (e.g., the identifier of the access point, the identifier of the base station, and GPS data) acquired from various electronic devices. The second database 422 may match and store the identifier of the base station and the location information based on the data (e.g., the identifier of the access point, the identifier of the base station, and the GPS data) acquired from various electronic devices.

According to various embodiments, the processor 410 may perform various operations of constructing and updating the first database 421 and/or the second database 422 of the memory 420 based on the data acquired through the communication interface 430. The processor 410 may receive at least parts of the identifier of at least one access point, the identifier of the base station, or the GPS location information collected by external electronic device through the communication interface 430, and it may update the first database 421 and/or the second database 422 based on the received data.

According to various embodiments, the first database 421 may match and store the identifiers of the access points (e.g., access points 221, 222, and 223 of FIG. 2) and the location information. Here, the identifier of the access point may include a basic service set identifier (BSSID), but it may include another identifier, such as a MAC address of the access point. The location information of the access points may be defined as coordinate information including latitude and longitude, but it is not limited thereto, and various parameters (e.g., point of interest (POI) or address) capable of defining the location may be used. According to various embodiments, the location information of the access point may not call only a specific point but may be defined as a coverage of a predetermined area including the specific point.

According to various embodiments, the second database 422 may match and store the identifiers of the base stations (e.g., base stations 230 of FIG. 2) and the location information. Here, the identifier of the base station may include a cell identifier (CID), but it is not limited thereto. In the same manner as the first database 421, the location information matching the identifiers of the base stations may be defined as coordinate information including latitude and longitude or other parameters.

Collected data (or location related data) that the server device 400 acquires from the electronic device may differ depending on the state of the electronic device. For example, if the GPS location information, the identifier of at least one access point, and the identifier of the base station are all acquired, the electronic device may transmit them to the server device 400, and if there is no access point located in the coverage (e.g., about 10 to 200 m) of the near field communication as the result of scanning the surrounding access points, the electronic device may transmit the GPS location information and the identifier of the base station to the server device 400. Further, if the location of the electronic device is the location in which the GPS satellite signal is unable to be received (e.g., inside a building), the electronic device may transmit the acquired identifier of the at least one access point and the identifier of the base station to the server device 400.

According to various embodiments, the server device 400 may divide the collected data received from the electronic device in accordance with the type of information included in the collected data, and it may store the divided data in the first database 421 and the second database 422.

According to various embodiments, if the identifier of the first access point and the GPS location information are received from the electronic device through the communication interface 430, the processor 410 may update the location information matching the identifier of the first access point in the first database 421 based on the GPS location information. The processor 410 may successively input the acquired location information in the first database 421, and it may delete the previously acquired location information that exceeds the location information collection time (e.g., one month) and the number of times of collection (e.g., 100 times) from the first database 421.

According to various embodiments, if the GPS location information is not received from the electronic device, but the identifier of the first access point (e.g., first access point 221 of FIG. 2) and the identifier of the second access point (e.g., second access point 222 of FIG. 2) are received through the communication interface 430, the processor 410 may update the location information matching the identifier of the first access point based on the location information matching the identifier of the second access point in the first database 421. If the identifiers of a plurality of access points are received together from the electronic device, it may be assumed that the identifiers of the plurality of access points are adjacently located in consideration of the coverage of the near field communication, and thus the processor can update the location information of the access point in accordance with the location information of other access points.

According to various embodiments, if the identifier of one access point (e.g., first access point) and the identifier of the base station are received from the electronic device through the communication interface 430, the processor 410 may identify the location information matching the received identifier of the base station in the second database 422, and it may update the location information matching the identifier of the first access point based on the location information matching the identified identifier of the base station. The coverage of the cellular communication of the base station is wider than the coverage of the near field communication, and thus usage of the location information of the base station may cause accuracy to be lowered in comparison with usage of the location information of other access points.

According to various embodiments, the first database 421 may store location information of a plurality of priorities matching the identifiers of the respective access points. The priority of the location information may be determined in accordance with a method for updating the location information, and the priority may include, for example, a first priority, a second priority, and a third priority in accordance with the accuracy.

The identifiers of the access points and the location information stored in the first database 421 may be exemplified as in Table 1.

TABLE 1

| Mac Address | SSID | Longitude (°) | Latitude (°) | Priority | Acquisition Time |
|---|---|---|---|---|---|
| 00:00:00:00:00:01 | Kim | 37.485280 | 126.879428 | 1 | 2018.07.05 10:00:00 |
| 00:00:00:00:00:01 | Kim | 37.485283 | 126.879430 | 1 | 2018.07.06 10:05:00 |
| 00:00:00:00:00:01 | Kim | 37.485260 | 126.879510 | 2 | 2018.07.05 12:00:00 |
| 00:00:00:00:00:01 | Kim | 37.485290 | 126.879550 | 2 | 2018.07.03 10:00:00 |
| 00:00:00:00:00:01 | Kim | 37.485310 | 126.879650 | 3 | 2018.07.03 10:05:00 |
| 00:00:00:00:00:03 | Park | 37.485353 | 126.879529 | 2 | 2018.07.03 10:00:00 |
| 00:00:00:00:00:03 | Park | 37.4853673 | 126.879531 | 3 | 2018.07.05 12:00:00 |

In Table 1 as above, the first access point (SSID: Kim) exemplifies acquisition of location information of the first priority, location information of the second priority, and location information of the third priority. Further, the second access point (SSID: Park) corresponds to a state where the location information of the first priority is not acquired, and thereafter, if the location information of the first priority is acquired from the electronic device, the location information of the first priority of the second access point may be updated into the first database 421. Here, the location information of the respective access points may be generated based on data received by different electronic devices, and at least parts thereof may be generated based on data received by the same electronic devices.

According to various embodiments, if the GPS location information and the identifier of at least one access point (e.g., first access point) are received from the electronic device through the communication interface 430, the processor 410 may update the location information of the first priority matching the identifier of the first access point of the first database 421 based on the GPS location information. The GPS location information has the highest accuracy, and thus the location information of the first priority may have a low error against the actual location in comparison with the location information of the second priority and the third priority.

According to various embodiments, if the GPS location information is not received from the electronic device, but the identifier of the first access point and the identifier of the second access point are received through the communication interface 430, the processor 410 may update the location information of the second priority matching the identifier of the first access point based on the location information matching the identifier of the second access point in the first database 421. If the location information of the first priority matching the identifier of the second access point exists in the first database 421, the processor 410 may update the location information of the second priority matching the identifier of the first access point based on the location information of the first priority, whereas if the location information of the first priority matching the identifier of the second access point does not exist, but only the location information of the second priority exists in the first database 421, the processor 410 may update the location information of the second priority matching the identifier of the first access point based on the location information of the second priority.

According to various embodiments, if the GPS location information is not received from the electronic device, but the identifier of one first access point and the identifier of the base station are received through the communication interface 430, the processor 410 may update the location information of the third priority of the first access point in the first database 421 based on the location information matching the identifier of the base station.

In the above-described embodiments, high accuracy (or low error) is obtained in the order of the first priority, the second priority, and the third priority, and if a request for the location information is received from the electronic device, the processor 410 may determine the location of the electronic device based on the location information having the highest priority among the location information matching the received identifier of the access point. For example, in Table 1, the first access point (SSID: Kim) indicates that the location information of the first priority exists in the first database 421, and if a request for the location information together with the identifier of the first access point is received from the electronic device, the processor 410 may determine the location of the electronic device based on the location information of the first priority of the first access point. Further, the second access point (SSID: Park) indicates that the location information of the first priority does not exist in the first database 421, and thus the processor 410 may determine the location of the electronic device based on the location information of the second priority that is a subordinated order.

According to various embodiments, in order to update the location information of a higher priority of the access point, the processor 410 may request at least one electronic device to provide the location information of the access point recorded with only the location information of the lower priority (e.g., second priority and/or third priority) in the first database 421.

According to various embodiments, the processor 410 may identify the identifier of at least one access point that does not match the location information of the first priority in the first database 421, and it may request the identifier of the corresponding access point and the GPS location information from at least one electronic device. In this case, the processor 410 may select at least one electronic device to request the GPS location information based on a time when the electronic device transmits the identifier of at least one access point that does not match the location information of the first priority. For example, the processor 410 may transmit the request to at least one electronic device transmitting most recently the identifier of at least one access point that does not match the location information of the first priority and the location information.

According to various embodiments, the processor 410 may select at least one access point that has not been collected for the longest time by aligning the access points in the order of collection of the location information in the database, and it may request the identifier of the at least one selected access point and the GPS location information from at least one electronic device. Further, the processor 410 may select at least one access point having the smallest number of times of collection by aligning the access points in the order of their small number of times of collection of the location information in the database, and it may request the identifier of the at least one selected access point and the GPS location information from the at least one electronic device.

According to various embodiments, the processor 410 may update the location information of the first priority (or the second priority) of the first database 421 based on data from at least one electronic device corresponding to the request.

According to various embodiments, the processor 410 may update the second database 422 based on the data transmitted from the electronic device. For example, if the electronic device transmits the identifier of the base station and the GPS location information, the processor 410 may update the location information matching the identifier of the corresponding base station in the second database 422 based on the received GPS location information. Further, if the electronic device transmits the identifier of the base station and the identifier of the access point without the GPS location information, the processor 410 may identify the location information matching the received identifier of the access point in the first database 421, and it may update the location information matching the identifier of the corresponding base station in the second database 422 based on the identified location information of the access point. In this case, the processor 410 may update the location information matching the identifier of the base station based on the location information of the highest priority among the location information of the access points.

According to various embodiments, if the identifier of at least one access point that does not match the location information of the first priority is transmitted from the electronic device and the GPS location information is not transmitted, the processor 410 may request the GPS location information from the electronic device. In this case, the processor 410 may update the location information of the first priority matching the identifier of the access point in accordance with the GPS location information received from the electronic device corresponding to the request.

Figure 5:
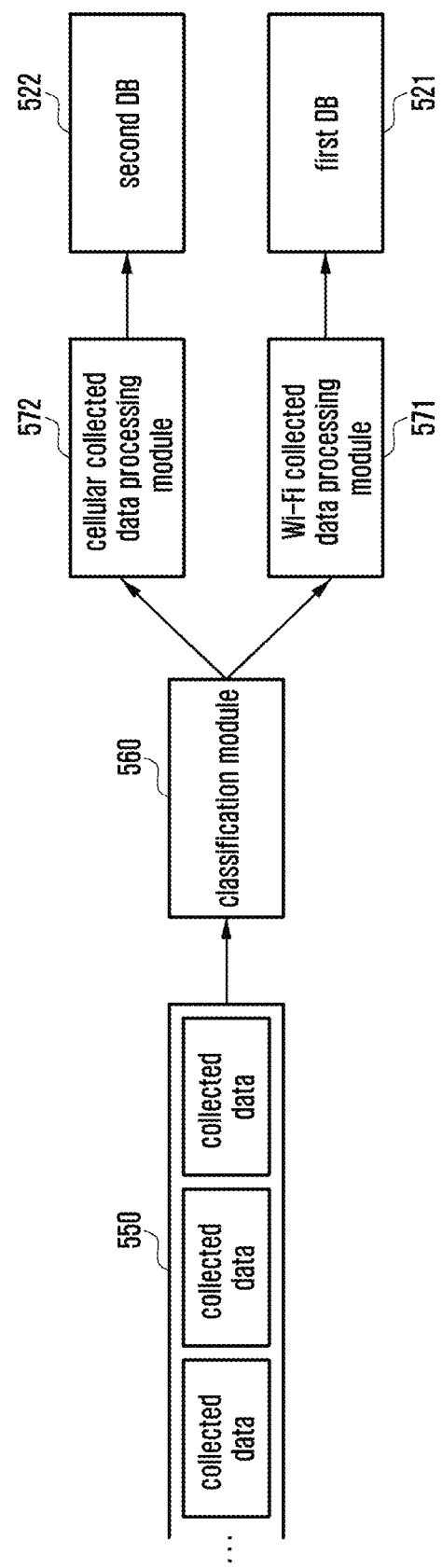
FIG. 5 illustrates a block diagram of a server device for processing location data according to various embodiments.

FIG. 5 illustrates a block diagram of a server device for processing location data according to various embodiments.

With reference to FIG. 5, a server device (e.g., server device 290 of FIG. 2 and/or server device 400 of FIG. 4) may receive collected data 550 collected by various electronic devices (e.g., electronic device 210 of FIG. 2 and/or electronic device 300 of FIG. 3) through a communication interface (e.g., communication interface 430 of FIG. 4). Here, the received collected data 550 may include the identifier of the base station (e.g., base station 230 of FIG. 2) and the GPS location information, or the identifier of the base station and the identifier of at least one access point (access points 221, 222, and 223 of FIG. 2), or the identifier of the base station, the identifier of at least one access point, and the GPS location information.

According to various embodiments, the server device may classify the collected data 550 in accordance with the kind of data included in the collected data 550 using a classification module 560. In this case, the classification module 560 may provide the collected data to a cellular collected data processing module 572 and a Wi-Fi collected data processing module 571 depending on whether the collected data 550 includes the location information of the access point. For example, if the collected data 550 includes the identifier of the base station and the GPS location information, the classification module 560 may input the corresponding collected data to the cellular collected data processing module 572. Further, if the collected data 550 includes the identifier of the base station, the identifier of at least one access point, and the GPS location information, the classification module 560 may input the corresponding collected data to the Wi-Fi collected data processing module 571.

According to various embodiments, the Wi-Fi collected data processing module 571 may update the location information corresponding to the access point in the first database 521 based on the collected data provided from the classification module 560. The server device may successively input the acquired location information acquired in the first database 521, and it may delete the previously acquired location information that exceeds the location information collection time (e.g., one month) and the number of times of collection (e.g., 100 times) from the first database 421. The information stored in the first database 521 has been described through Table 1 as described above.

According to various embodiments, the cellular collected data processing module 572 may update the location information corresponding to the base station in the second database 522 based on the collected data provided from the classification module 560.

According to various embodiments, the classification module 560, the Wi-Fi collected data processing module 571, and/or the cellular collected data processing module 572 may be software modules including instructions for performing respective functions, or separate hardware modules.

Figure 6:
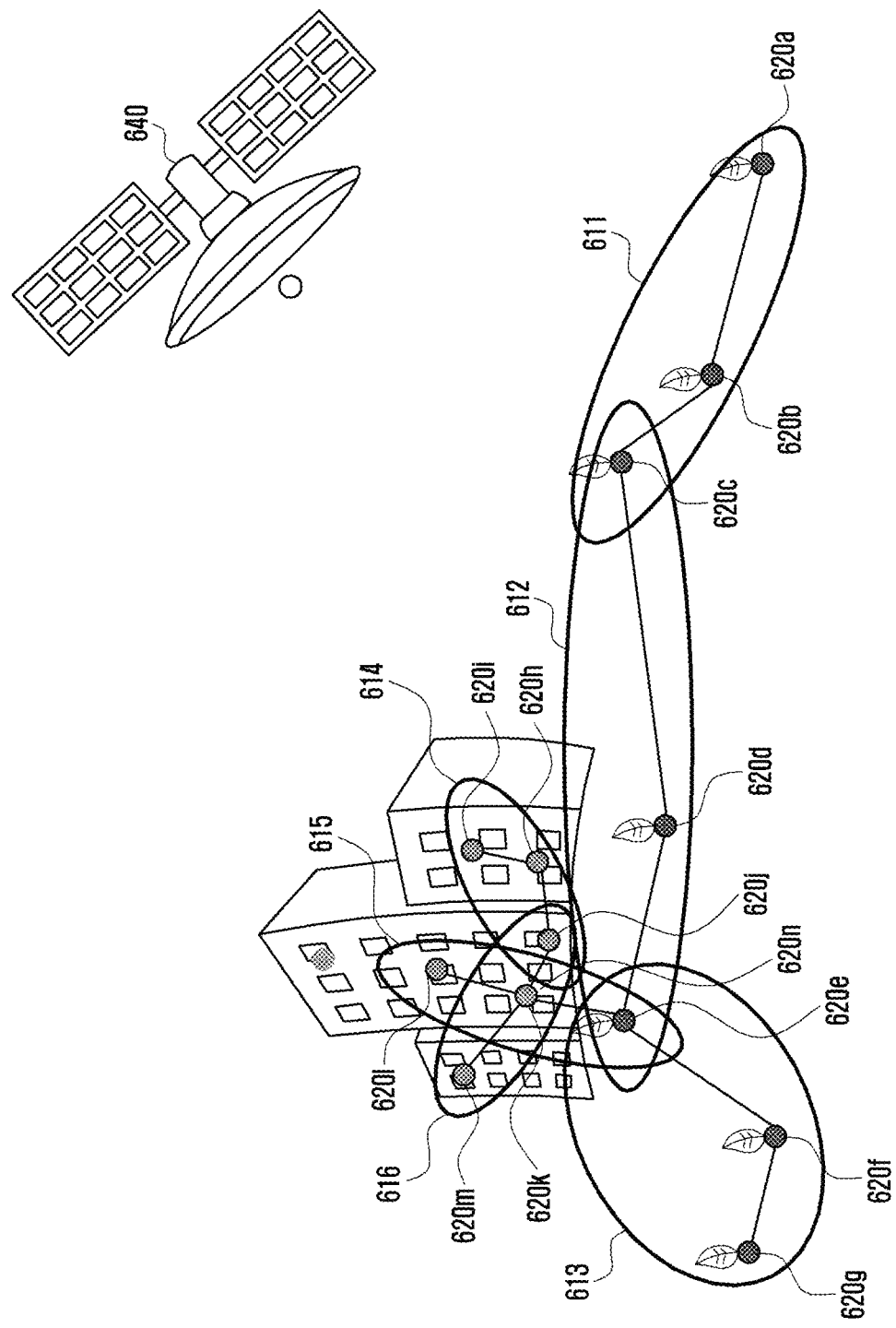
FIG. 6 illustrates a diagram of an example of access points capable of being scanned by an electronic device according to various embodiments.

FIG. 6 illustrates a diagram of an example of access points capable of being scanned by an electronic device according to various embodiments.

With reference to FIG. 6, in an embodiment, total 14 access points 620a to 620n are deployed, and among them, 7 access points 620a to 620g may be deployed in a location (e.g., outdoors) in which a GPS signal of a GPS satellite 640 can be received, and the remaining 7 access points 620h to 620n may be deployed in a location (e.g., inside a building) in which the GPS signal is unable to be received. Further, 6 electronic devices (e.g., electronic devices 210 of FIG. 2) may scan at least one access point using near field communication, and ranges in which respective electronic devices can scan may be like 611 to 616. For example, the third access point 620c may belong to both a scan range 611 of the first electronic device and a scan range 612 of the second electronic device.

Because the cellular communication has no limitations even indoors, 6 electronic devices can acquire identifiers of all base stations (e.g., base stations 230 of FIG. 2) using the cellular communication.

The first electronic device can scan the first access point 620a, the second access point 620b, and the third access point 620c located outside (611), and because the first electronic device is located outside, it can receive the GPS signal of the GPS satellite 640. The first electronic device may transmit the identifiers of the first access point 620a, the second access point 620b, and the third access point 620c, the identifier of the base station, and the GPS location information to the server device (e.g., server device 290 of FIG. 2 and/or server device 400 of FIG. 4). In this case, the server device may update the location information of the first priority corresponding to the identifiers of the first access point 620a, the second access point 620b, and the third access point 620c in the first database (e.g., first database 421 of FIG. 4) based on the received GPS location information. Further, the server device may update the location information corresponding to the identifier of the base station in the second database (e.g., second database 422 of FIG. 4) based on the received GPS location information.

The fourth electronic device may scan the eighth access point 620h, the ninth access point 620i, and the tenth access point 620j located inside a building (614), and because the fourth electronic device is located inside a building, it may not receive the GPS signal. The fourth electronic device may transmit the identifiers of the eighth access point 620h, the ninth access point 620i, and the tenth access point 620j, and the identifier of the base station to the server device. In this case, the server device may update the location information of the second priority of the eighth access point 620h, the ninth access point 620i, and the tenth access point 620j in the first database based on the location information of the first priority or the second priority of one other access point.

Figure 7A:
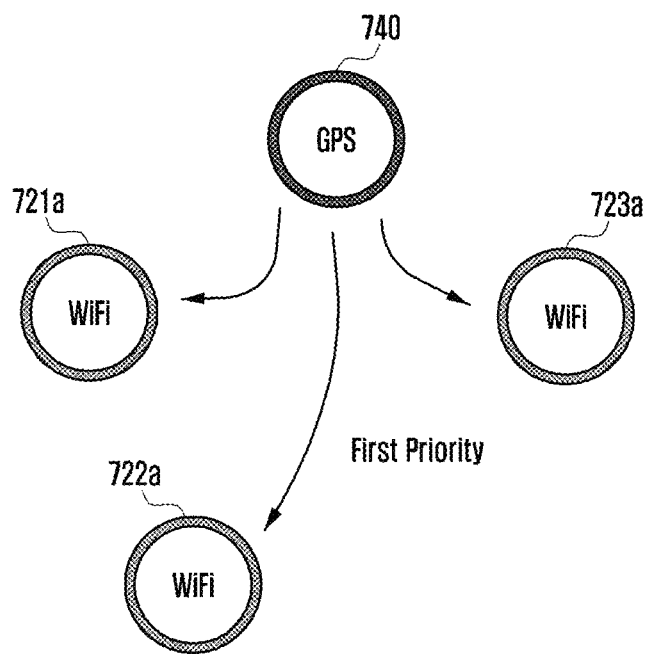
FIG. 7A illustrates a diagram of an example in which the priority of location information is determined in accordance with the type of acquired location information according to various embodiments.
Figure 7B:
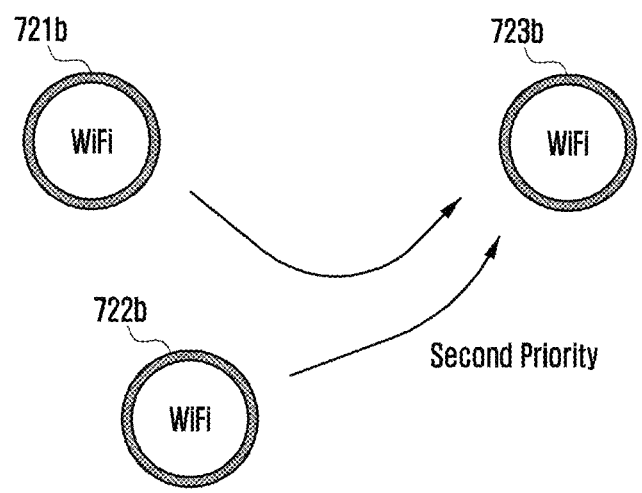
FIG. 7B illustrates a diagram of an example in which the priority of location information is determined in accordance with the type of acquired location information according to various embodiments.
Figure 7C:
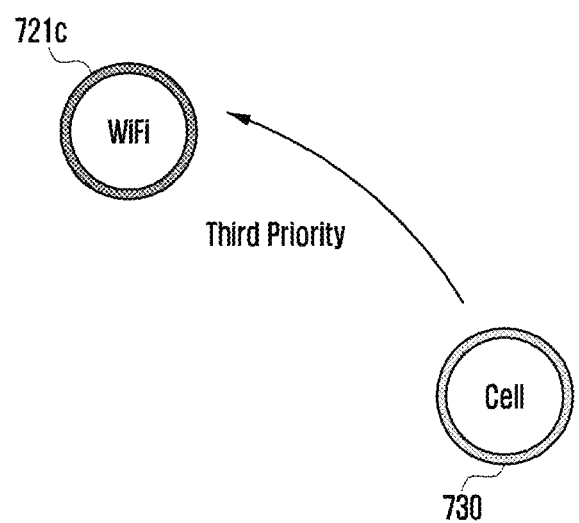
FIG. 7C illustrates a diagram of an example in which the priority of location information is determined in accordance with the type of acquired location information according to various embodiments.

FIGS. 7A to 7C illustrate diagrams of examples in which the priority of location information is determined in accordance with the type of acquired location information according to various embodiments.

FIG. 7A exemplifies a case where a server device (e.g., server device 290 of FIG. 2 and/or server device 400 of FIG. 4) receives identifiers of a first access point 721a, a second access point 722a, and a third access point 723a and GPS location information 740 from an electronic device (e.g., electronic device 210 of FIG. 2 and/or electronic device 300 of FIG. 3). In this case, the server device may update the location information of the first priority corresponding to the identifiers of the first access point 721a, the second access point 722a, and the third access point 723a in the first database (e.g., first database 421 of FIG. 4) based on the GPS location information 740.

FIG. 7B exemplifies a case where a server device receives identifiers of a first access point 721b, a second access point 722b, and a third access point 723b from an electronic device, but it does not receive GPS location information. In this case, if the location information of the first priority and/or the second priority of the first access point 721b and/or the second access point 722b is stored in the first database, the server device may update the location information of the second priority of the third access point 723b in the first database based on this.

FIG. 7C exemplifies a case where a server device receives an identifier of a first access point 721c and an identifier of a base station 730 from an electronic device. In this case, the server device may identify the location information corresponding to the received identifier of the base station 730, and it may update the location information of the third priority corresponding to the identifier of the first access point 721c in the first database based on the identified location information.

The server device 400 according to various embodiments may include a communication interface 430; a memory 420; and a processor 410 operatively connected to the communication interface 430 and the memory 420, wherein the memory 420 is configured to store a first database 421 including identifiers of access points and location information, and the processor 410 is configured to receive, from an external electronic device through the communication interface 430, an identifier of at least one access point including a first access point collected by the external device and an identifier of a base station, identify location information matching the identifier of the at least one access point and/or the identifier of the base station in the first database 421, and update location information matching an identifier of the first access point in the first database 421 based on the identified location information.

According to various embodiments, the processor 410 may be configured to update the location information matching the identifier of the first access point based on location information matching an identifier of a second access point in the first database 421 if the identifier of the first access point and the identifier of the second access point are received through the communication interface 430.

According to various embodiments, the memory 420 may be configured to store a second database 422 including identifiers of base stations and location information, and the processor 410 is configured to update the location information matching the identifier of the first access point based on location information matching the received identifier of the base station in the second database 422 if the identifier of the access point different from the first access point is not received through the communication interface 430.

According to various embodiments, the first database 421 may be configured to store location information of a plurality of priorities matching the identifiers of the respective access points.

According to various embodiments, the processor 410 may be configured to update the location information of the first priority matching the identifier of the first access point based on global positioning system (GPS) location information if the GPS location information is received from the external electronic device through the communication interface 430.

According to various embodiments, the processor 410 may be configured to update the location information of the second priority matching the identifier of the first access point based on the location information of the first priority or the second priority matching an identifier of a second access point in the first database 421 if the identifier of the first access point and the identifier of the second access point are received through the communication interface 430.

According to various embodiments, the processor 410 may be configured to update the location information of the third priority matching the identifier of the first access point based on the location information matching the received identifier of the base station if the GPS location information and the identifier of the access point different from the first access point are not received from the external electronic device.

According to various embodiments, the processor 410 may be configured to identify the identifier of the at least one access point that does not match the location information of the first priority in the first database 421, and to request the identified identifier of the at least one access point and GPS location information from at least one external electronic device through the communication interface 430.

According to various embodiments, the processor 410 may be configured to request the GPS location information from the external electronic device if the identifier of the at least one access point that does not match the location information of the first priority is transmitted from the external electronic device.

According to various embodiments, the processor 410 may be configured to select the at least one external electronic device to request the GPS location information based on a time when the external electronic device transmits the identifier of the at least one access point that does not match the location information of the first priority.

According to various embodiments, the processor 410 may be configured to receive a request for the location information including the identifier of the at least one access point from the external electronic device through the communication interface 430, identify the location information matching the received identifier of the at least one access point in the first database 421, and transmit the location information having the highest priority among the identified location information to the external electronic device through the communication interface 430.

According to various embodiments, the identifier of the access point may include a basic service set identifier (BSSID).

Figure 8:
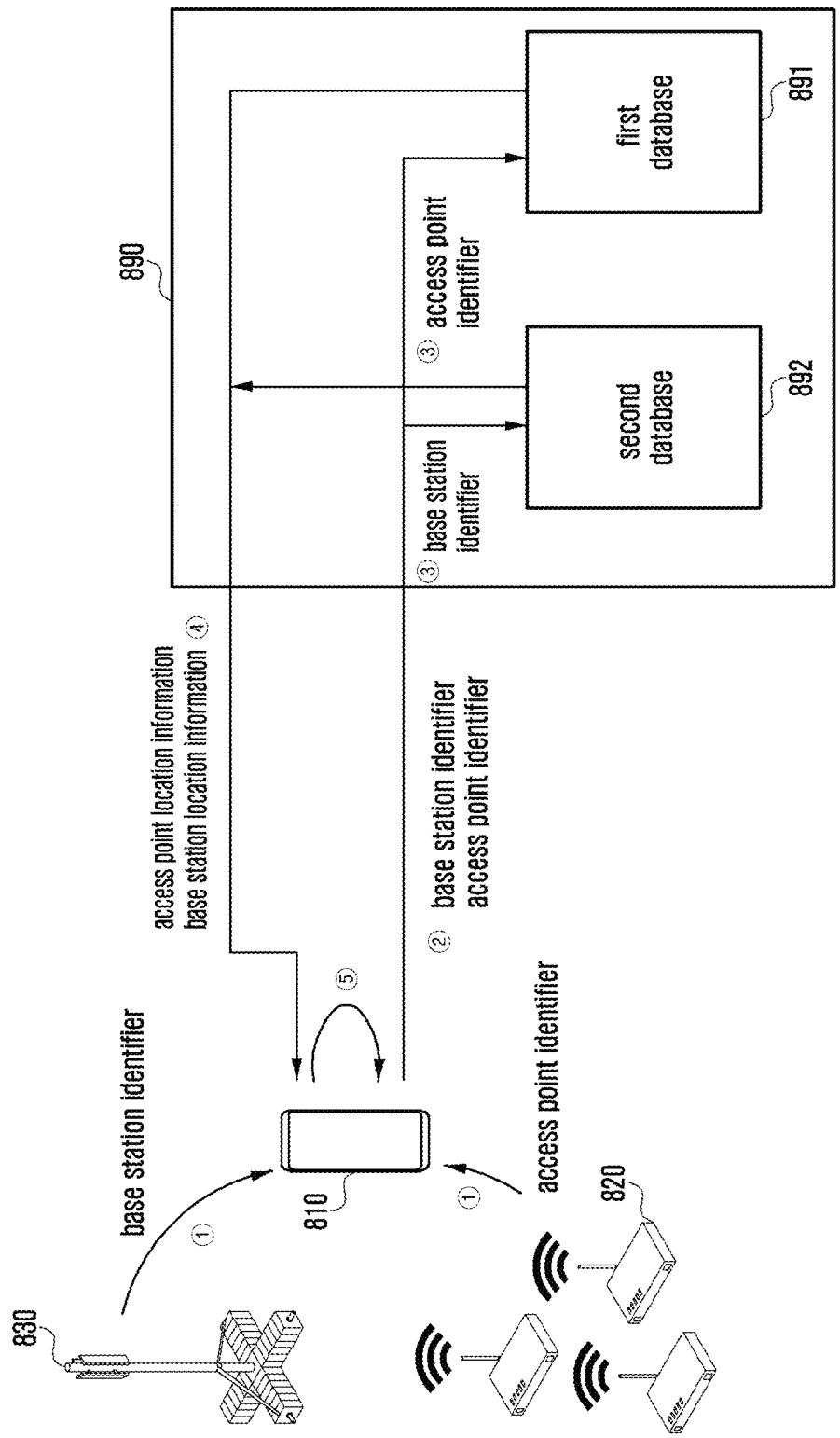
FIG. 8 illustrates a diagram of an embodiment in which an electronic device determines its own location according to various embodiments.

FIG. 8 illustrates a diagram of an embodiment in which an electronic device determines its own location according to various embodiments.

With reference to FIG. 8, if a location information request event generated from an application is identified, an electronic device 810 according to various embodiments (e.g., processor 310 of FIG. 3) may identify an identifier (e.g., BSSID) of at least one access point 820 by scanning an adjacent access point 820 (e.g., access points 221, 222, and 223 of FIG. 2) using a first wireless communication circuit (e.g., first wireless communication circuit 330 of FIG. 3). Further, the electronic device 810 may identify an identifier (e.g., CID) of a base station 830 using a second wireless communication circuit (e.g., second wireless communication circuit 340 of FIG. 3).

According to various embodiments, the electronic device 810 may transmit, to a server device 890, a list (e.g., BSSID list) including the identifier (e.g., CID) of at least one access point 820 and the identifier (e.g., BSSID) of the base station 830 acquired through a network using the first wireless communication circuit and/or the second wireless communication circuit.

According to various embodiments, the server device 890 (e.g., processor 410 of FIG. 4) may receive the list of the identifier of at least one access point 820 and the identifier of the base station 830, and it may identify location information matching the identifier of the at least one access point 820 received in a pre-constructed first database 891 (or Wi-Fi DB). Further, the server device 890 may identify the location information matching the identifier of the base station 830 received in a second database 892 (or cell DB).

According to various embodiments, the server device 890 may update the location information corresponding to the identifier of the at least one access point 820 received in the first database 891 based on the received data. Further, the server device 890 may update the location information corresponding to the identifier of the base station 830 in the second database 892 based on the received data.

According to various embodiments, the server device 890 may transmit, to the electronic device 810, location information (or Wi-Fi location list) related to the identifier of the at least one access point 820 and location information (or cell location) related to the identifier of the base station 830.

According to various embodiments, the electronic device 810 may determine the location of the electronic device 810 using a positioning algorithm based on the location information acquired from the server device 890. For example, the electronic device 810 may determine an average value of the acquired location information as the location of the electronic device 810. As another embodiment, the location information related to the received identifier of the access point 820 and/or the identifier of the base station 830 may have a coverage covering a predetermined area, and the electronic device 810 may determine an area in which coverages of the acquired location information overlap each other.

Figure 9:
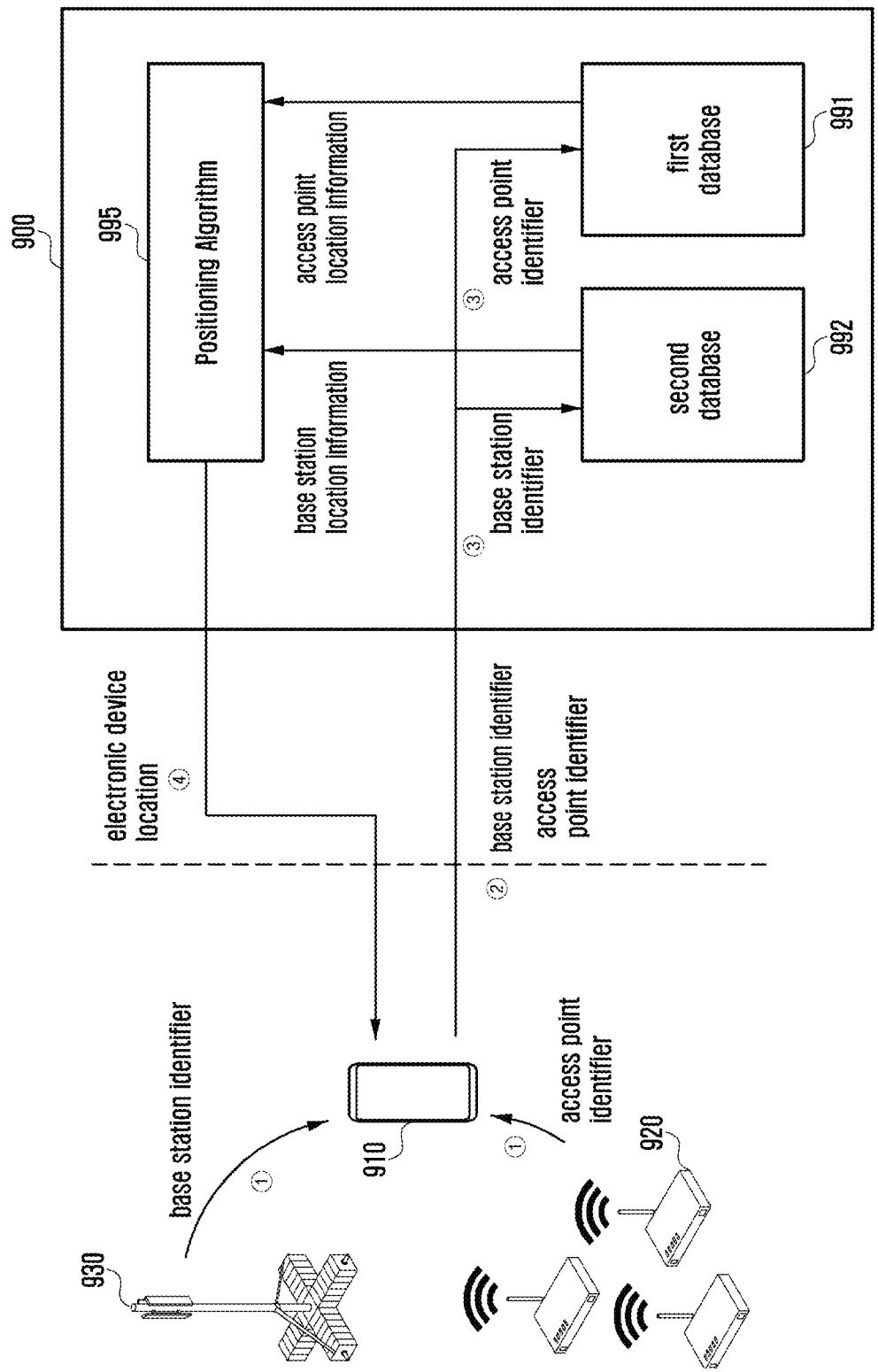
FIG. 9 illustrates a diagram of an embodiment in which a server device determines the location of an electronic device according to various embodiments.

FIG. 9 illustrates a diagram of an embodiment in which a server device determines the location of an electronic device according to various embodiments.

With reference to FIG. 9, if a location information request event generated from an application is identified, an electronic device 910 according to various embodiments (e.g., processor 310 of FIG. 3) may identify an identifier (e.g., BSSID) of at least one access point 920 by scanning an adjacent access point 920 using a first wireless communication circuit (e.g., first wireless communication circuit 330 of FIG. 3). Further, the electronic device 910 may identify an identifier (e.g., CID) of a base station 930 using a second wireless communication circuit (e.g., second wireless communication circuit 340 of FIG. 3).

According to various embodiments, the electronic device 910 may transmit, to a server device 900, a list of the identifier of at least one access point 920 and the identifier of the base station 930 acquired through a network using the first wireless communication circuit and/or the second wireless communication circuit.

According to various embodiments, the server device 900 may receive the identifier of at least one access point 920 and the identifier of the base station 930, and it may identify location information (or Wi-Fi location) matching the identifier of the at least one access point 920 received in a pre-constructed first database 991 (or Wi-Fi DB). Further, the server device 900 may identify the location information (or cell location) matching the identifier of the base station 930 received in a second database 992 (or cell DB).

According to various embodiments, the server device 900 may determine the location of the electronic device 910 using a positioning algorithm 995 based on the location information acquired from the first database 991 and the second database 992. The positioning algorithm 995 may be included in various instructions stored in a memory (e.g., memory 820 of FIG. 8) of the server device, and it may be performed by the processor (e.g., processor 810 of FIG. 8). The server device 900 may transmit the determined location (or device location) of the electronic device 910.

Figure 10:
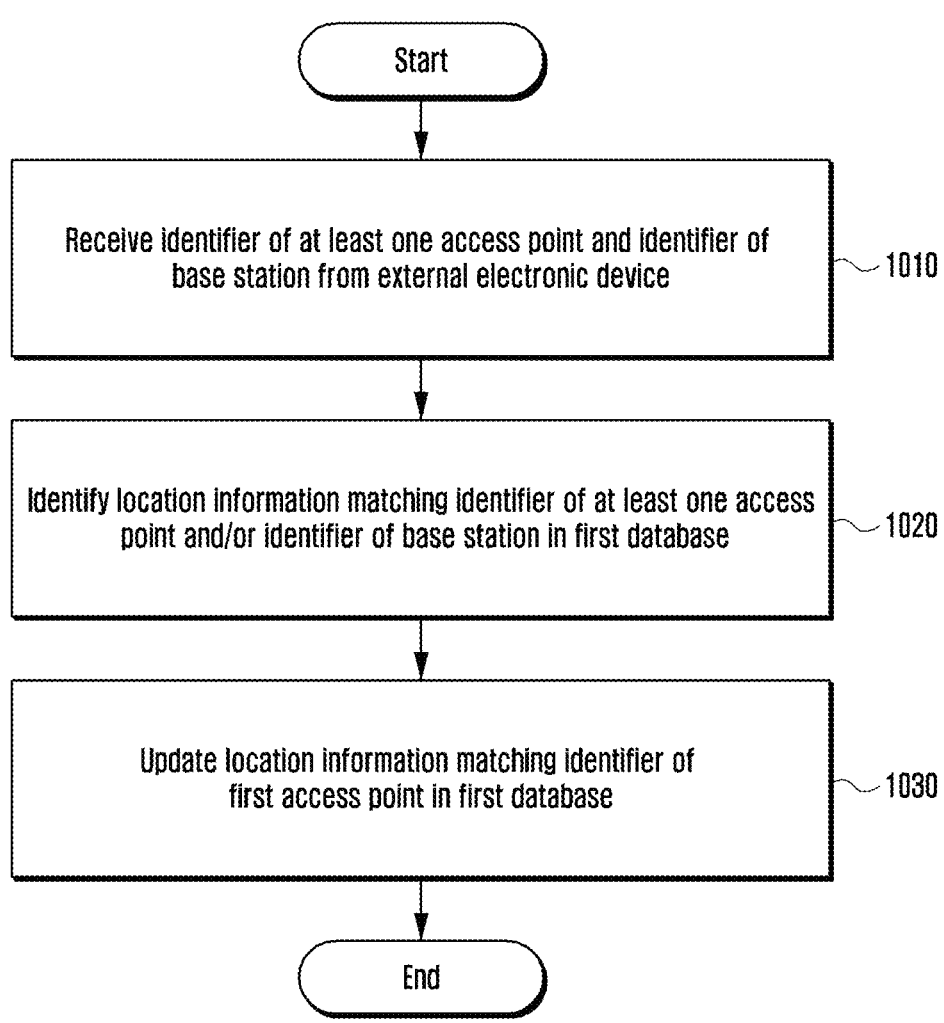
FIG. 10 illustrates a flowchart of a method by a server device for collecting location information of access points according to various embodiments.

FIG. 10 illustrates a flowchart of a method by a server device for collecting location information of access points according to various embodiments.

The illustrated method may be performed by the server device of FIGS. 2 to 9, and hereinafter, description of the technical features as described above will be omitted.

With reference to FIG. 10, at operation 1010 according to various embodiments, a server device (e.g., server device 290 of FIG. 2 and/or server device 400 of FIG. 4) may receive, from an electronic device (e.g., electronic device 210 of FIG. 2 and/or electronic device 300 of FIG. 3), an identifier of at least one access point including a first access point (e.g., first access point 211 of FIG. 2) collected by the electronic device and an identifier of a base station (e.g., electronic device 230 of FIG. 2).

According to various embodiments, the electronic device may acquire the identifier of the at least one adjacent access point using near field communication (e.g., Wi-Fi), and it may acquire the identifier of the base station using cellular communication (e.g., LTE). The identifier of the access point may include a basic service set identifier (BSSID), and the identifier of the base station may include a cell identifier (CID).

According to various embodiments, at operation 1020, the server device may identify location information matching the identifier of the at least one access point and/or the identifier of the base station in the first database.

According to various embodiments, the server device may store a first database (e.g., first database 421 of FIG. 4) and a second data base (e.g., second database 422 of FIG. 4). The first database may match and store the identifier of the access point and the location information based on data (e.g., the identifier of the access point, the identifier of the base station, and GPS data) acquired from several electronic devices. The second database may match and store the identifier of the base station and the location information based on the data (e.g., the identifier of the access point, the identifier of the base station, and the GPS data) acquired from several electronic devices.

According to various embodiments, the first database may store location information of a plurality of priorities matching the identifiers of respective access points. The priority of the location information may be determined in accordance with a method for updating location information, and the priority may include, for example, a first priority, a second priority, and a third priority in accordance with accuracy. Information stored in the first database has been exemplified through Table 1 as described above.

According to various embodiments, at operation 1030, the server device may update the location information matching the identifier of the first access point in the first database.

According to various embodiments, if the identifier of the first access point and the identifier of the second access point are received from the electronic device, the server device may update the location information matching the identifier of the first access point based on the location information matching the identifier of the second access point in the first database.

According to various embodiments, if the identifier of one access point (e.g., first access point) and the identifier of the base station are received from the electronic device, the server device may identify the location information matching the received identifier of the base station in the second database, and it may update the location information matching the identifier of the first access point based on the location information matching the identified identifier of the base station.

Figure 11:
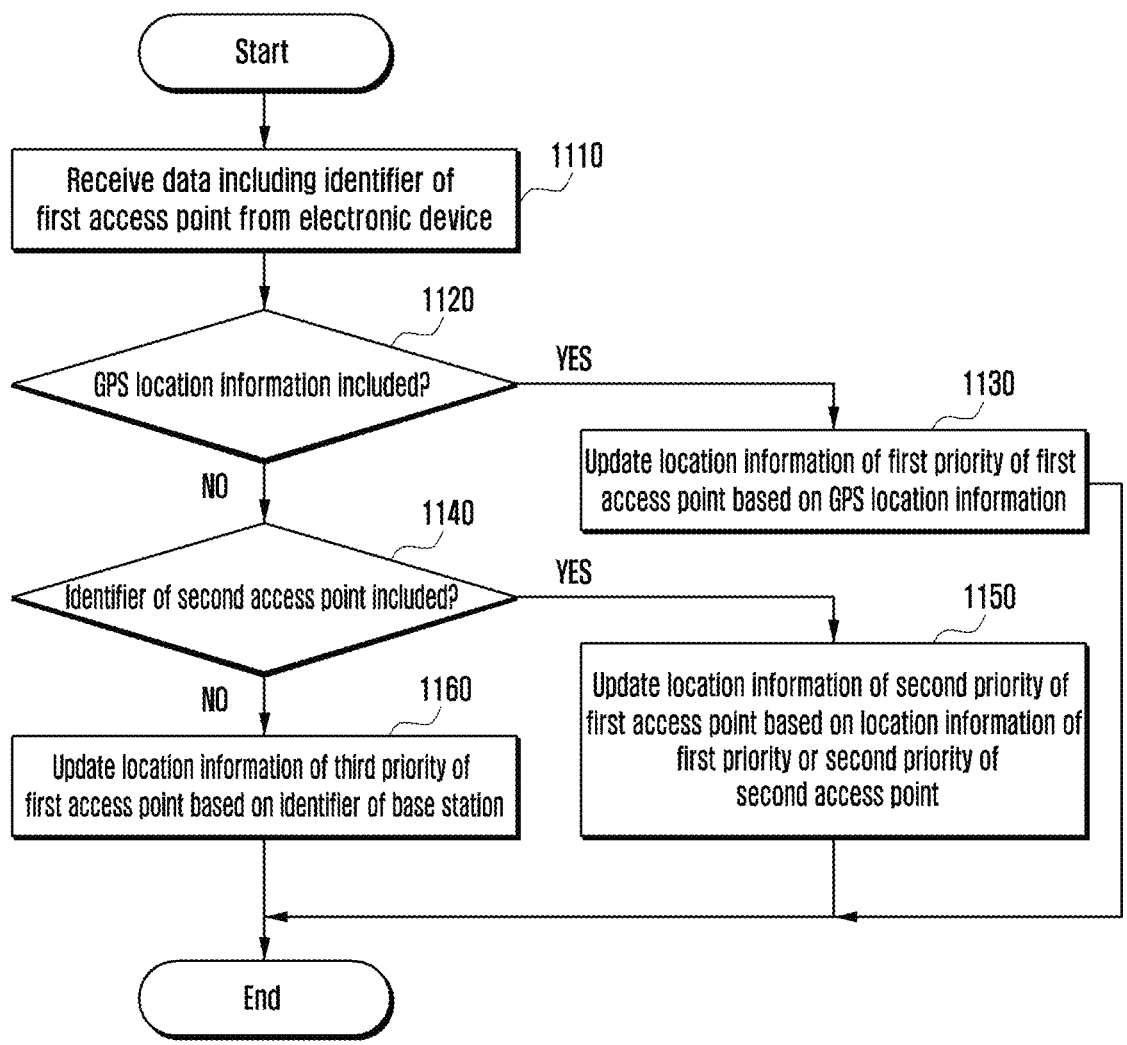
FIG. 11 illustrates a flowchart of a method by a server device for collecting location information of access points according to various embodiments.

FIG. 11 illustrates a flowchart of a method by a server device for collecting location information of access points according to various embodiments.

The illustrated method may be performed by the server device of FIGS. 2 to 9, and hereinafter, description of the technical features as described above will be omitted.

With reference to FIG. 11, at operation 1110 according to various embodiments, a server device (e.g., server device 290 of FIG. 2 and/or server device 400 of FIG. 4) may receive, from an electronic device (e.g., electronic device 210 of FIG. 2 and/or electronic device 300 of FIG. 3), collected data including an identifier of the first access point (e.g., first access point 211 of FIG. 2). According to various embodiments, the received collected data may further include at least parts of an identifier of a second access point (e.g., second access point 212 of FIG. 2), the identifier of the base station, and the GPS location information.

At operation 1120, the server device may identify whether the received collected data includes the GPS location information.

According to various embodiments, if the collected data includes the GPS location information, at operation 1130, the server device may update the location information of the first priority of the first access point in the first database (e.g., first database 421 of FIG. 4) based on the GPS location information. The GPS location information has the highest accuracy, and thus the location information of the first priority may have a low error against the actual location in comparison with the location information of the second priority and the third priority.

According to various embodiments, if the collected data includes the GPS location information, at operation 1140, the server device may identify whether the received collected data includes the identifier of the second access point.

According to various embodiments, if the collected data includes the identifier of the second access point, at operation 1150, the server device may update the location information of the second priority of the first access point based on the location information of the first priority or the second priority of the second access point.

According to various embodiments, if the location information of the first priority matching the identifier of the second access point exists in the first database, the server device may update the location information of the second priority matching the identifier of the first access point based on the location information of the first priority, and if the location information of the first priority matching the identifier of the second access point does not exist, and only the location information of the second priority exists in the first database, the server device may update the location information of the second priority matching the identifier of the first access point based on the location information of the second priority.

According to various embodiments, if the collected data does not include the GPS location information and the identifier of the second access point, at operation 1160, the server device may update the location information of the third priority of the first access point based on the received identifier of the base station.

According to various embodiments, the server device may identify the location information matching the identifier of the base station in the second database, and it may update the location information of the third priority corresponding to the identifier of the first access point in the first database based on the location information matching the identified identifier of the first access point.

According to various embodiments, a method by a server device for collecting location information of other devices, the server device storing a first database including identifiers of access points and location information, the method includes receiving, from an external electronic device, an identifier of at least one access point including a first access point collected by the external electronic device and an identifier of a base station (1010); identifying location information matching the identifier of the at least one access point and/or the identifier of the base station in the first database (1020); and updating location information matching an identifier of the first access point in the first database based on the identified location information (1030).

According to various embodiments, the first database may be configured to store location information of a plurality of priorities matching the identifiers of the respective access points.

According to various embodiments, the method may further include receiving global positioning system (GPS) location information from the external electronic device, wherein updating the location information includes updating the location information of the first priority matching the identifier of the first access point based on the GPS location information.

According to various embodiments, updating the location information may include updating the location information of the second priority matching the identifier of the first access point based on the location information of the first priority or the second priority matching an identifier of a second access point in the first database if the identifier of the first access point and the identifier of the second access point are received.

According to various embodiments, updating the location information may include updating the location information of the third priority matching the identifier of the first access point based on the location information matching the received identifier of the base station if the GPS location information and the identifier of the access point different from the first access point are not received from the external electronic device.

According to various embodiments, the method may further include identifying the identifier of the at least one access point that does not match the location information of the first priority in the first database; and requesting the identified identifier of the at least one access point and GPS location information from at least one external electronic device.

Figure 12:
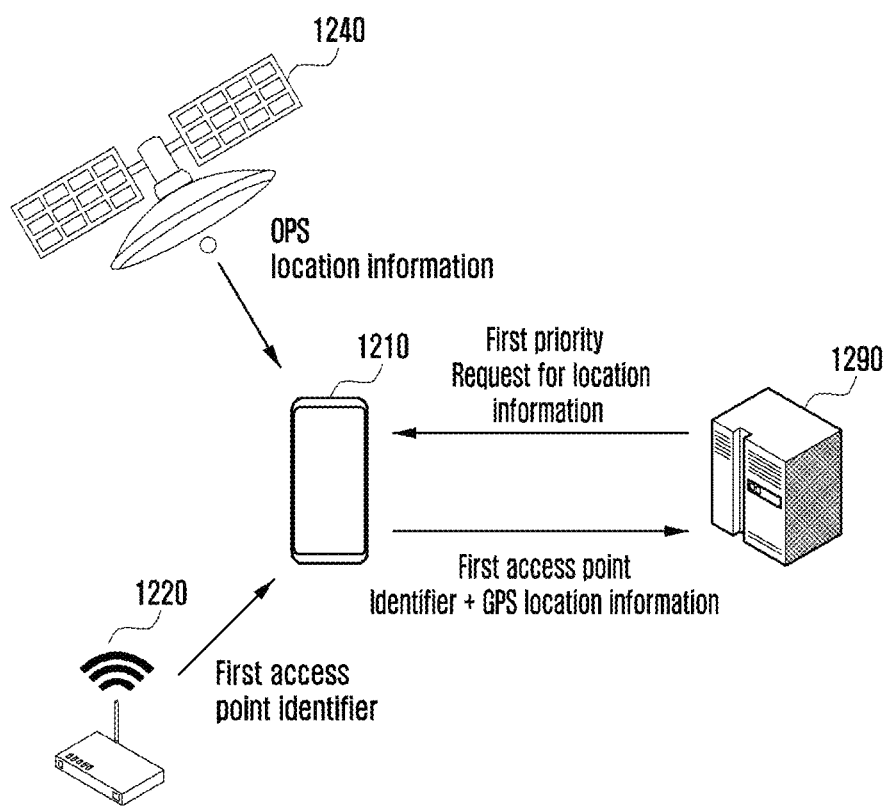
FIG. 12 illustrates a diagram of an embodiment in which a server device requests an electronic device to provide location information of an access point according to various embodiments.

FIG. 12 illustrates a diagram of an embodiment in which a server device requests an electronic device to provide location information of an access point according to various embodiments.

According to various embodiments, a server device 1290 may request an identifier of a specific access point (e.g., first access point 1220) and GPS location information from an electronic device.

According to various embodiments, the server device 1290 may store location information of a plurality of priorities matching the access points on a first database (e.g., first database 410 of FIG. 4), and the location information of the first priority may correspond to matching of the identifier of the first access point 1220 to GPS location information based on a signal of a GPS satellite 1240 if the GPS location information and the identifier of the access point are received from a specific electronic device 1210. The server device 1290 may identify the identifier of the first access point that does not match the location information of the first priority in the first database, and it may request the location information of the first priority including a request for the identifier of the first access point 1220 and the GPS location information from the electronic device 1210. In this case, the server device 1290 may transmit the request to the at least one electronic device that has most recently transmitted the identifier of the first access point 1220 that does not match the location information of the first priority and the location information.

According to various embodiments, if the request for the location information of the first priority is received from the server device 1290, the electronic device 1210 may scan at least one adjacent access point using the first wireless communication circuit (e.g., first wireless communication circuit 330 of FIG. 3). If the first access point 1220 is scanned as the result of the scanning, the electronic device 1210 may identify the GPS location information using a GPS sensor (e.g., GPS sensor 350 of FIG. 3). Here, if the location of the electronic device 1210 is the location in which a signal of a GPS satellite 1240 is unable to be received (e.g., inside a building), the processor 310 may periodically perform scanning of the access points and the GPS reception, and if the identification of the first access point 1220 and the GPS reception are performed together, the processor 310 may transmit the acquired identifier of the first access point 1220 and the GPS location information to the server device 1290. If the first access point 1220 is not identified as the result of the scanning, the processor 310 may not transmit the GPS location information to the server device 1290.

According to various embodiments, the server device 1290 may select at least one access point that has not been collected for the longest time by aligning the access points in the order of collection of the location information in the first database, and it may request the identifier of the at least one selected access point and the GPS location information from the at least one electronic device. Further, the server device 1290 may select at least one access point having the smallest number of times of collection by aligning the access points in the order of their number of times of collection of the location information in the database, and it may request the identifier of the at least one selected access point and the GPS location information from the at least one electronic device 1210.

Although the present disclosure has been described with various embodiments, various changes and modifications may be suggested to one skilled in the art. It is intended that the present disclosure encompass such changes and modifications as fall within the scope of the appended claims.

What is claimed is:

1. A server device comprising:
a communication interface;
a memory configured to store a first database including identifiers of access points and location information and a second database including identifiers of base stations and location information; and
a processor operatively connected to the communication interface and the memory, wherein the processor is configured to:
receive, from an external electronic device through the communication interface, (i) an identifier of at least one access point, including a first access point collected by the external electronic device, and (ii) an identifier of a base station,
identify location information matching the identifier of the at least one access point or the identifier of the base station in the first database, and update location information matching the identifier of the first access point in the first database based on the identified location information, and
update the location information matching the identifier of the first access point based on location information matching the received identifier of the base station in the second database if an identifier of an access point that is different from the identifier of the first access point is not received through the communication interface.

2. The server device of claim 1, wherein the processor is configured to update the location information matching the identifier of the first access point based on location information matching an identifier of a second access point in the first database if (i) the identifier of the first access point and (ii) the identifier of the second access point are received through the communication interface.

3. The server device of claim 1, wherein the first database is configured to store location information of a plurality of priorities matching the identifiers of the respective access points.

4. The server device of claim 3, wherein the processor is configured to:

identify the identifier of the at least one access point that does not match the location information of a first priority in the first database, and
request the identified identifier of the at least one access point and GPS location information from at least one external electronic device through the communication interface.

5. The server device of claim 4, wherein the processor is configured to request the GPS location information from the external electronic device if the identifier of the at least one access point that does not match the location information of the first priority is transmitted from the external electronic device.

6. The server device of claim 4, wherein the processor is configured to select the at least one external electronic device to request the GPS location information based on a time when the external electronic device transmits the identifier of the at least one access point that does not match the location information of the first priority.

7. The server device of claim 3, wherein the processor is configured to:
receive a request for the location information including the identifier of the at least one access point from the external electronic device through the communication interface,
identify the location information matching the received identifier of the at least one access point in the first database, and
transmit the location information having a highest priority among the identified location information to the external electronic device through the communication interface.

8. The server device of claim 1, wherein the processor is configured to update the location information of a first priority matching the identifier of the first access point based on global positioning system (GPS) location information if the GPS location information is received from the external electronic device through the communication interface.

9. The server device of claim 8, wherein the processor is configured to update the location information of a second priority matching the identifier of the first access point based on the location information of the first priority or location information of the second priority matching an identifier of a second access point in the first database if the identifier of the first access point and the identifier of the second access point are received through the communication interface.

10. The server device of claim 9, wherein the processor is configured to update the location information of a third priority matching the identifier of the first access point based on the location information matching the received identifier of the base station if (i) the GPS location information and (ii) the identifier of an access point different from the first access point are not received from the external electronic device.

11. The server device of claim 1, wherein the identifier of the access point comprises a basic service set identifier (BSSID).

12. A method by a server device for collecting location information of other devices, the server device storing a first database including identifiers of access points and location information and a second database including identifiers of base stations and location information, the method comprising:
receiving, from an external electronic device, (i) an identifier of at least one access point including a first access point collected by the external electronic device and (ii) an identifier of a base station;
identifying location information matching (i) the identifier of the at least one access point or (ii) the identifier of the base station in the first database;
updating location information matching an identifier of the first access point in the first database based on the identified location information; and
updating the location information matching the identifier of the first access point based on location information matching the received identifier of the base station in the second database in case that an identifier of an access point that is different from the identifier of the first access point is not received.

13. The method of claim 12, wherein the first database is configured to store location information of a plurality of priorities matching the identifiers of the respective access points.

14. The method of claim 13, further comprising receiving global positioning system (GPS) location information from the external electronic device, wherein updating the location information includes updating the location information of a first priority matching the identifier of the first access point based on the GPS location information.

15. The method of claim 14, wherein updating the location information comprises:
in response to the identifier of the first access point and the identifier of a second access point being received, updating the location information of a second priority matching the identifier of the first access point based on the location information of (i) the first priority or (ii) the second priority matching an identifier of a second access point in the first database.

16. The method of claim 15, wherein updating the location information comprises:
in response to the GPS location information and the identifier of the access point different from the first access point being not received from the external electronic device, updating the location information of a third priority matching the identifier of the first access point based on the location information matching the received identifier of the base station.

17. The method of claim 13, further comprising:
identifying the identifier of the at least one access point that does not match the location information of a first priority in the first database; and
requesting the identified identifier of the at least one access point and GPS location information from at least one external electronic device through a communication interface.

* * * * *